Sept. 5, 1967 H. J. ROWAN ETAL 3,339,334
BAR SECTIONS
Filed March 5, 1964 2 Sheets-Sheet 1
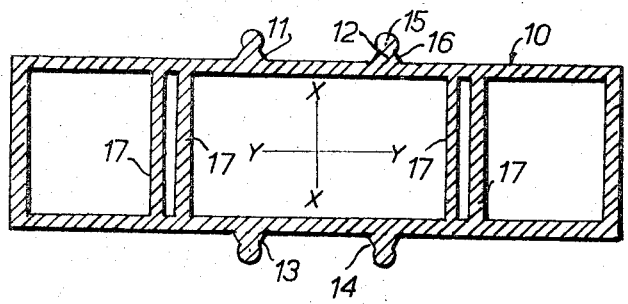
— FIG. 1. —
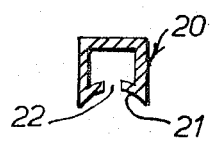
— FIG. 2. —
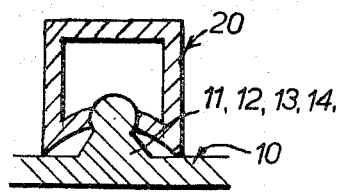
— FIG. 3. —
INVENTORS:
HENRY J. ROWAN
EDMUND D. ROWAN
BY
Browne, Schuyler + Burridge
ATTORNEYS Sept. 5, 1967    H. J. ROWAN ETAL    3,339,334
BAR SECTIONS
Filed March 5, 1964    2 Sheets-Sheet 2
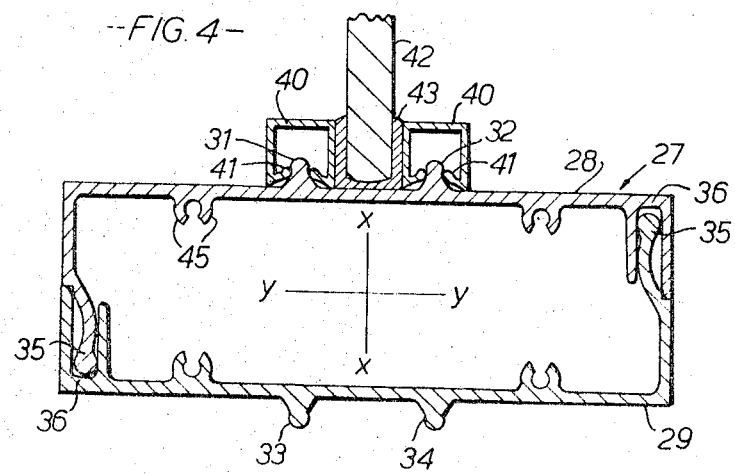
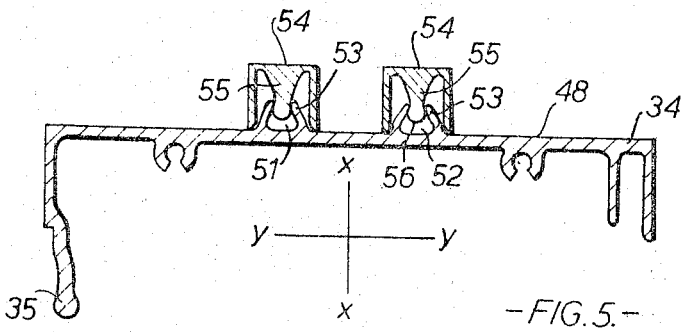
INVENTORS:
HENRY J. ROWAN
EDMUND D. ROWAN
BY
Browne, Schuyler & Beveridge
ATTORNEYS United States Patent Office 3,339,334
Patented Sept. 5, 1967

3,339,334
BAR SECTIONS
Henry John Rowan and Edmund Damian Rowan, both of 23 Caithness Drive, Crosby, Liverpool, England
Filed Mar. 5, 1964, Ser. No. 349,650
6 Claims. (Cl. 52—731)

The present invention relates to bar sections and more particularly to an extruded or rolled section bar suitable for use in the construction of curtain-walling, partitioning, windows, ceilings and doors, door frames and the like.

With the use of known extruded and rolled section bars in the construction of curtain-walling a glazing bead has to be screwed into position on at least one side of the panes of glass, when the walling is being glazed. This is a laborious operation and it is an object of the invention to avoid the necessity for screws when glazing curtain-walling and panelling partitions.

According to one aspect of the present invention, an extruded or rolled section bar for use in constructing curtain-walling, partitioning and the like is formed at at least one side with at least one longitudinal snap-fastener means adapted to receive a bead having complementary snap-fastener means.

According to another aspect of the invention, an extruded or rolled section bar is formed at one side either with at least one rib, over which can be snap-fitted a bead having a longitudinal slot defined between springy lips.

Preferably the bar is formed at at least one side with a pair of parallel ribs, each adapted for the snap-fitting thereto of a bead.

One embodiment of the extruded or rolled section bar is formed symmetrically with a pair of parallel ribs at each side. The parallel ribs are preferably formed with a somewhat bulbous free edge so that the glazing bead can be readily received and firmly held in position.

Another embodiment of extruded or rolled section bar has one longitudinal edge formed as a male portion and an opposite longitudinal edge as a complementary female portion so that a second bar of the same section can be fitted to the first bar with the male portion of each bar received in the female portion of the other bar to provide a composite exteriorly symmetrical bar with a pair of parallel ribs or slots at each side.

In a method of constructing curtain-walling, partitioning, windows, ceilings, doors, door frames or the like, according to a further aspect of the invention, a framework is built from extruded or rolled section bar having longitudinal snap-fastener means thereon and bead is snap-fitted on to said snap-fastener means for retaining glass panes, panels or the like in said framework.

According to a still further aspect of the invention, an extruded or rolled section bar has one longitudinal edge formed as a male portion and an opposite longitudinal edge as a complementary female portion so that a second bar of the same section can be fitted to the first bar with the male portion of each bar received in the female portion of the other bar to provide a composite bar.

Aluminum or an aluminum alloy is contemplated as being a suitable material for extruded section bar as it is comparatively cheap and easy to extrude, but it will be obvious that any other metal or metal alloy or plastics or like material having the desired resilience may be used.

The invention includes an extrusion die for extruding the above-described novel sections.

The invention is further described by way of example with reference to the accompanying drawings, wherein:

FIG. 1 illustrates the extruded section of one embodiment of bar according to the invention for use in constructing curtain-walling;

FIG. 2 is an extruded section of a glazing bead for use with the bar of FIG. 1;

FIG. 3 is a detailed section to a larger scale illustrating a glazing bead fitted in place;

FIG. 4 is a cross section of a composite bar formed from bars according to another embodiment of the invention, and FIG. 5 is a cross section of a further embodiment of bar according to the invention.

Referring to FIG. 1 of the drawings, an extruded section metal bar 10, preferably of aluminum or aluminum alloy, for use in constructing a framework for curtain-walling has a generally box-like configuration but is provided with a pair of parallel ribs 11 and 12 at one side and another pair of parallel ribs 13 and 14 at the other side. Each rib has a somewhat bulbous free edge 15 which in the embodiment shown is of part-circular section. The bulbous free edge 15 is joined by a tapered portion 16 to the main body of the section.

FIG. 2 shows a metal glazing bead 20, preferably also of extruded aluminum or aluminum alloy, which is of generally square configuration but which is formed with a concave side 21 provided with a slot 22. The dimensions of the concave side 21 and the slot 22 are such as to permit the bead 20 to be snap-fitted onto a rib 11, 12, 13 or 14 of the curtain-walling section 10 as illustrated in detail in FIG. 3.

It will be seen that by the provision of a pair of ribs 11 and 12 or 13 and 14 the curtain-walling may be glazed from inside or from outside.

When fitting panelling to the framework, the panelling being of substantially greater thickness than glass, it may prove necessary to secure an L-section member by screws to the curtain-walling to support the panelling at one side. Such screws can be concealed by the edge of the panelling if desired since the panelling is finally secured by a glazing bead 20 at the other side.

To enable the extruded section bar 10 to be adapted for other purposes, suitable adapter sections may be clipped to the parallel ribs 11, 12, 13 or 14 instead of the glazing bead 20. Such adapter sections may themselves be provided with parallel ribs similar to the ribs 11 to 14, for example further apart, so that the glazing bead 20 may be used to secure panelling at both sides, which panelling is thick compared with the glass.

The extruded section bar 10 of FIG. 1 is shown as being provided with internal webs 17 to provide additional strength and for receiving screws if such are required. However, the internal webs 17 may be omitted if desired with a view to reducing the cost of the section and especially with a view to reducing the cost of the extrusion dies from which the section is to be formed.

It will be seen that the ribs 11, 12, 13 and 14 are symmetrical with respect to the $x$ axis of the section and with respect to the $y$ axis of the section. Also the section of the bar is completely symmetrical about its $x$ and $y$ axes.

FIG. 4 illustrates in section a composite bar 27 formed of two extruded section metal bars 28 and 29 of identical section and preferably of aluminum or aluminum alloy. The bar 28 is provided with a pair of parallel ribs 31 and 32 and the bar 29 is provided with a pair of parallel ribs 33 and 34. Each bar 28 or 29 has a male portion 35 along one longitudinal edge and a complementary female portion 36 along its opposite longitudinal edge. As can be seen, the male portion 35 of each bar is received in the female portion 36 of the other bar to form the composite bar 27. In the composite bar, the ribs 31 and 32 are symmetrical about the $x$ axis of the composite bar and the ribs 33 and 34 are likewise symmetrical relative to the $x$ axis. Also the ribs 31 and 33 are symmetrical relative to the $y$ axis as are the ribs 32 and 34. The male portions 35 and also the female portions 36 of the bars are symmetrical relative to the $x$ and $y$ axes but the exterior surfaces of the composite bar 27 are asymmetrical relative to both axes and the exterior periphery is rectangular apart from the ribs 31, 32, 33 and 34.

The ribs 31, 32, 33 and 34 have a somewhat bulbous free edge so that beads 40 can be snapped onto the ribs. The beads 40 are of extruded metal section, preferably of aluminum or aluminum alloy, and are generally square in section but one side is concave arcuate and is provided with a slot for receiving the appropriate bulbous edge of the rib on the bar 28 or 29. The lips 41 along the edges of the longitudinal slot in the bead 40 are springy relative to one another due to the resilience of the material of the bead. As can be seen in the drawing, a window pane 42 or panel is retained between the beads 40 and a suitable sealing composition 43, such as putty, may be provided between the pane 42 and the beads 40.

Pairs of arcuate section internal ribs 45 are provided on the bars 28 and 29 for the purpose of receiving self-tapping screws during construction of a framework for the curtain-walling and the like.

The embodiment of the invention illustrated in FIG. 1 of the drawings may be modified by the provision of pairs of internal arcuate ribs similar to the ribs 45 of FIG. 4 instead of the internal webs 17.

FIG. 5 illustrates a modification of the invention wherein an extruded section metal bar 48, preferably of aluminum or aluminum alloy, has longitudinal edges formed with male and female portions 35 and 36 for assembly into a composite bar. The bar 48 of FIG. 5, however, is not provided with ribs but instead with a pair of parallel slots 51 and 52. The slots are defined between resilient lips 53 on the exterior surface of the section 48. Beads 54 are provided with internal ribs 55 having a bulbous free edge 56 which can be snap-fitted between the resilient lips 53 to retain the beads in place.

We claim:

1. For use in curtain-walling, panelling and the like, the combination of a frame bar section and two pairs of hollow glazing bead sections, said frame bar section having perpendicular $x$ and $y$ axes and a pair of solid longitudinal ribs on each of opposite sides thereof and formed integrally therewith, each of said longitudinal ribs having a bulbous free edge, said pairs of ribs being symmetrically disposed relatively to said $y$ axis and the ribs of each said pair thereof being symmetrically disposed relatively to said $x$ axis, and each of said hollow glazing bead sections having a pair of longitudinal corner edges and a pair of springy lips defining a concave face delimited by said corner edges, said springy lips having free edges spaced apart to define a continuous longitudinal slot in said concave face, said slot and said bulbous free edge on a corresponding one of said longitudinal ribs being so relatively dimensioned as to provide a snap fit between said frame bar action and each of said bead sections, and said sections when snap-fitted together being in contact with one another only along said corner edges of said concave face and along said free edges of said springy lips, the latter free edges lying beneath said bulbous free edge of said rib.

2. The combination according to claim 1, wherein said bar section is substantially completely symmetrical about said $y$ axis.

3. The combination according to claim 1, wherein said bar section is substantially completely symmetrical about both its $x$ axis and its $y$ axis.

4. The combination according to claim 1 wherein said bar and bead sections are extruded sections and comprise a material selected from the class consisting of aluminum and aluminum alloys.

5. For use in curtain-walling, panelling and the like, the combination of a pair of frame bar sections and two pairs of hollow glazing bead sections, said frame bar sections being identical to one another in section and each frame bar section having longitudinal side edges, one of said side edges being formed as a male fitting and the other of said side edges being formed as a complementary female fitting so that the two frame bar sections can be fitted to one another to form a composite bar with the male fitting of each frame bar section received in the female fitting of the other frame bar section, said composite bar having perpendicular $x$ and $y$ axes and a pair of solid longitudinal ribs on each of opposite sides thereof and formed integrally with said frame bar sections, each of said longitudinal ribs having a bulbous free edge, said pairs of ribs being symmetrically disposed relatively to said $y$ axis and the ribs of each said pair thereof being symmetrically disposed relatively to said $x$ axis, said male and female fittings being asymmetrical with respect to one another about said $x$ and $y$ axes, and each of said hollow glazing bead sections having a pair of longitudinal corner edges and a pair of springy lips defining a concave face delimited by said corner edges, said springy lips having free edges spaced apart to define a continuous longitudinal slot in said concave face, said slot and said bulbous free edge on a corresponding one of said longitudinal ribs being so relatively dimensioned as to provide a snap fit between said frame bar sections and each of said bead sections, and said sections when snap-fitted together being in contact with one another only along said corner edges of said concave face and along said free edges of said springy lips, the latter free edges lying beneath said bulbous free edge of said rib.

6. The combination according to claim 5 in which said frame bar section has external surfaces which are such that when said identical bar section is fitted thereto the exterior surfaces of the composite bar so formed are completely symmetrical relative to both said $x$ and $y$ axes.

References Cited

UNITED STATES PATENTS

| | | | |
|---|---|---|---|
| 3,002,235 | 10/1961 | Fountain | 52—731 |
| 3,016,993 | 1/1962 | Owen | 52—502 |
| 3,140,763 | 7/1964 | Edelstein | 52—235 |

FOREIGN PATENTS

| | | |
|---|---|---|
| 564,762 | 2/1958 | Belgium. |
| 323,832 | 1/1930 | Great Britain. |
| 900,669 | 7/1962 | Great Britain. |
| 565,192 | 7/1957 | Italy. |

REINALDO P. MACHADO, *Primary Examiner.*